(12) United States Patent
Sergison et al.

(10) Patent No.: US 7,837,220 B2
(45) Date of Patent: Nov. 23, 2010

(54) TANDEM WHEEL ARRANGEMENT

(75) Inventors: Daniel P. Sergison, East Peoria, IL (US);
Norval P. Thomson, Dunlap, IL (US);
Steven A. Daniel, East Peoria, IL (US);
W. Christopher Swick, Raleigh, NC (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 12/171,115

(22) Filed: Jul. 10, 2008

(65) Prior Publication Data

US 2010/0007118 A1  Jan. 14, 2010

(51) Int. Cl.
*B60G 5/00* (2006.01)

(52) U.S. Cl. .......................... 280/676; 280/682
(58) Field of Classification Search .................. 280/676, 280/682
See application file for complete search history.

(56) References Cited

U.S. PATENT DOCUMENTS

| | | | |
|---|---|---|---|
| 1,627,225 A | 5/1927 | Babel et al. | |
| 1,784,268 A | 12/1930 | Buckendale et al. | |
| 1,817,514 A | 8/1931 | Hutt | |
| 1,912,498 A | 6/1933 | Rayburn | |
| 1,925,536 A | 9/1933 | Judd | |
| 2,124,149 A | 7/1938 | Redhead | |
| 2,225,016 A | 12/1940 | Mallett et al. | |
| 3,603,423 A | 9/1971 | Schoonover | |
| 3,716,250 A | 2/1973 | Gorres | |
| 3,770,072 A | 11/1973 | Cheney | |
| 3,786,888 A | 1/1974 | Nelson | |
| 3,792,871 A * | 2/1974 | Chalmers | 280/681 |
| 3,833,236 A | 9/1974 | Davis et al. | |
| 3,884,155 A | 5/1975 | Maroshick | |
| 3,901,329 A | 8/1975 | Eftefield | |
| 3,915,252 A | 10/1975 | Datta et al. | |
| 3,923,112 A | 12/1975 | Goodgame | |
| 4,043,584 A | 8/1977 | Wagner et al. | |
| 4,359,914 A | 11/1982 | Meisel, Jr. | |
| 4,460,196 A | 7/1984 | Perlini | |
| 4,756,550 A | 7/1988 | Raidel | |
| 5,129,463 A | 7/1992 | Handy | |
| 5,186,485 A | 2/1993 | Orr et al. | |
| 5,333,895 A | 8/1994 | Fujan et al. | |
| 5,362,177 A | 11/1994 | Bohall et al. | |
| 5,417,297 A | 5/1995 | Auer | |
| 6,135,220 A * | 10/2000 | Gleasman et al. | 180/9.1 |
| 6,916,037 B2 * | 7/2005 | Baxter et al. | 280/683 |
| 7,178,824 B2 | 2/2007 | Ziech | |
| 7,258,182 B2 | 8/2007 | Auer | |
| 7,296,642 B1 * | 11/2007 | DeWald | 180/6.38 |
| 2005/0263300 A1 | 12/2005 | Banks | |
| 2005/0263985 A1 * | 12/2005 | Miller et al. | 280/678 |
| 2006/0191695 A1 | 8/2006 | Walker et al. | |

* cited by examiner

*Primary Examiner*—Toan C To
(74) *Attorney, Agent, or Firm*—Leydig, Voit & Mayer

(57) ABSTRACT

A machine (100) includes a frame (102) portion and a tandem wheel arrangement, which includes a main linkage (312) and a stabilizing linkage (322) that are pivotally connected to the frame (102) portion. A first mount (304) and a second mount (304) are pivotally connected to the main linkage (312) and to the stabilizing linkage (322), such that the main linkage (312), the stabilizing linkage (322), the first mount (304), and the second mount (304) define a four-bar-linkage arrangement (202) that operates to transfer unbalanced torque loads from the first mount (304) and the second mount (304) to the frame (102) portion.

19 Claims, 4 Drawing Sheets

TANDEM WHEEL ARRANGEMENT

TECHNICAL FIELD

This patent disclosure relates generally to tandem wheel arrangements and, more particularly, to tandem wheel arrangements that include two or more wheels arranged in a tandem configuration.

BACKGROUND

Tandem wheel arrangements have two or more wheels arranged in line with each other. Earthmoving machines, for example, use tandem wheel arrangements for applications requiring traction and stability while operating over rough terrain. Once such machine, for example, is a motor grader, which is a type of machine that is typically used to create a flat or graded surface of a landscape. Other examples of machines or vehicles having tandem drive arrangements include trucks, trains, moving platforms, gantry cranes, and so forth. Tandem wheel arrangements may employ hydraulic, electrical, or mechanical power to propel one or more of the wheels in the arrangement. Such arrangements typically have both wheels capable of powered rotation, preferably at equal torques, such that the tandem arrangement remains balanced and stable.

A typical drive configuration for tandem wheels includes a rotating sprocket that powers one or more wheels of the arrangement via chains. The sprocket, chains, and associated gears are typically enclosed within an enclosure or beam, which is pivotally connected to the machine at a location close to the sprocket. The chains are typically arranged to provide an equal amount of torque to each driven wheel because, otherwise, a moment may be applied to the tandem drive arrangement. This moment may cause instabilities, for example, by lifting a portion of the tandem wheel arrangement relative to another portion such that one or more wheels of the arrangement cannot fully engage the driving surface.

SUMMARY

In one aspect, this disclosure provides a machine having a balanced tandem wheel arrangement. The machine includes a frame portion having a main linkage and a stabilizing linkage pivotally connected thereto. A first mount and a second mount are pivotally connected to the main linkage and to the stabilizing linkage, such that the main linkage, the stabilizing linkage, the first mount, and the second mount define a four-bar-linkage arrangement that operates to transfer unbalanced torque loads from the first mount and the second mount to the frame portion.

In another aspect, this disclosure provides a tandem drive arrangement that is pivotally connected to a frame of a machine. The tandem drive arrangement includes a first motor defining a first stator portion and a first rotor portion. A first mount is connected to the first stator portion, and a first set of pin bosses is connected to the first mount. A first pin opening that is formed in the first set of pin bosses extends parallel to a first axis of rotation of the first rotor portion with respect to the first stator portion. A main linkage forms a first main pin opening adjacent to a first end thereof and a bearing opening disposed in a mid-portion thereof. The main linkage is arranged to pivot with respect to the frame. A first main pin is disposed within the first main pin opening and the first pin opening formed in the first set of pin bosses. A load sharing arrangement is associated with the tandem drive arrangement such that the load sharing arrangement balances unbalanced loading in the tandem drive arrangement by transferring the unbalanced loading to the frame.

In yet another aspect, this disclosure describes a tandem drive arrangement for a machine. The tandem drive arrangement includes a first mount forming a first pin opening and a second pin opening. A second mount forms an additional first pin opening and an additional second pin opening. A first bar is pivotally connected to a frame of the machine about a pivot and forms a first mount pin opening and a second mount pin opening. A second bar is pivotally connected to the frame and forms a first additional mount pin opening and an additional second mount pin opening. A first pin extends through the first pin opening and the first mount pin opening to pivotally connect the first bar to the first mount. A second pin extends through the additional first pin opening and the second mount pin opening to pivotally connect the first bar to the second mount. A third pin extends through the second pin opening and the first additional mount pin opening to pivotally connect the second bar to the first mount. A fourth pin extends through the additional second pin opening and the additional second mount pin opening to pivotally connect the second bar to the second mount. Lastly, a frame pin pivotally connects the second bar to the frame.

DETAILED DESCRIPTION

A motor grader is used in the description that follows as an example for illustration of the various drive and load sharing arrangements that can be used on machines having tandem drive arrangements. As can be appreciated, any other vehicle having a tandem drive arrangement can benefit from the advantages described herein.

Figure 1A:
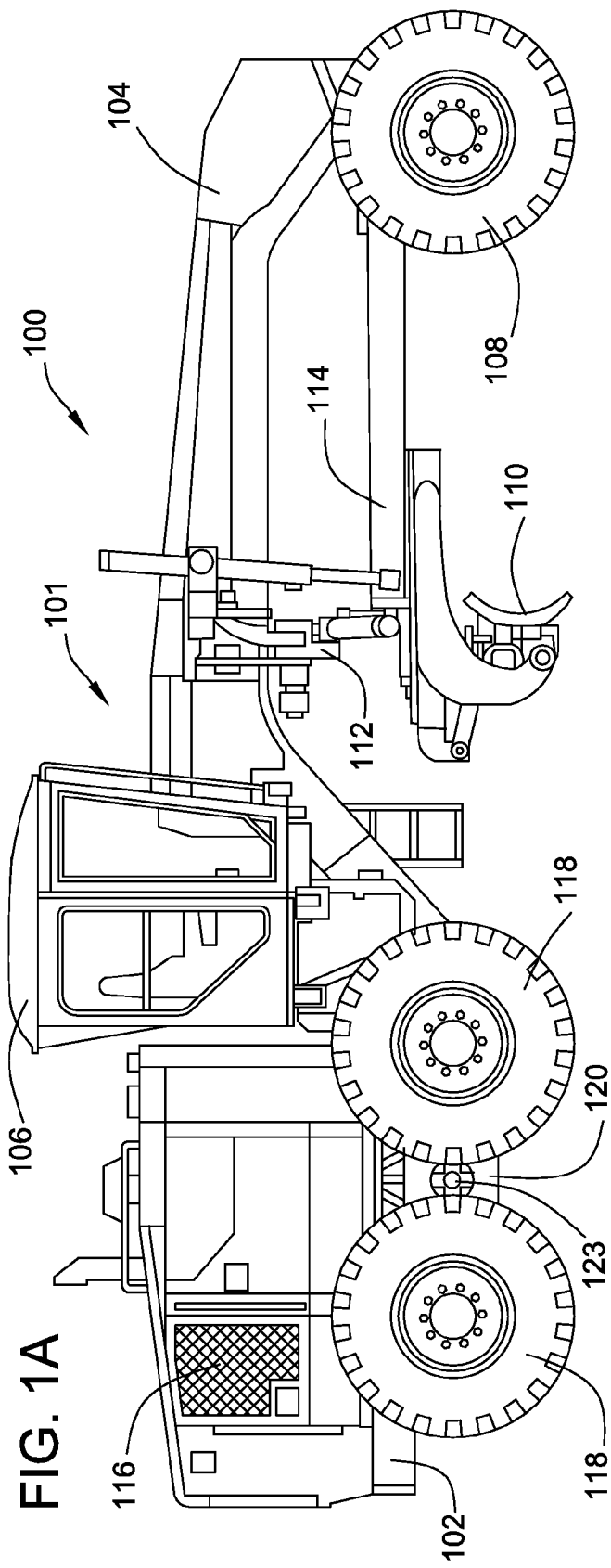
FIG. 1A and FIG. 1B are outline views of, respectively, a side and a bottom perspective of a motor grader machine in accordance with the disclosure.

A side view of a machine 100, in this example a motor grader 101, is shown in FIG. 1A. The term "machine" is used generically to describe any machine having at least one drive wheel that is directly driven by a motor connected to the wheel, for example, by use of electrical or hydrostatic power. A machine having a hydrostatically operated propel circuit for moving the machine across the terrain and a hydraulically operated implement circuit operating an implement for performing various machine tasks is described herein for the sake of illustration, but any other mode of powering the machine is contemplated, for example, by use of electrically operated motors and/or actuators. For instance, an alternative embodiment for the machine 100 may include a generator or another device capable of producing an alternative form of energy, such as electrical power.

Figure 1B:
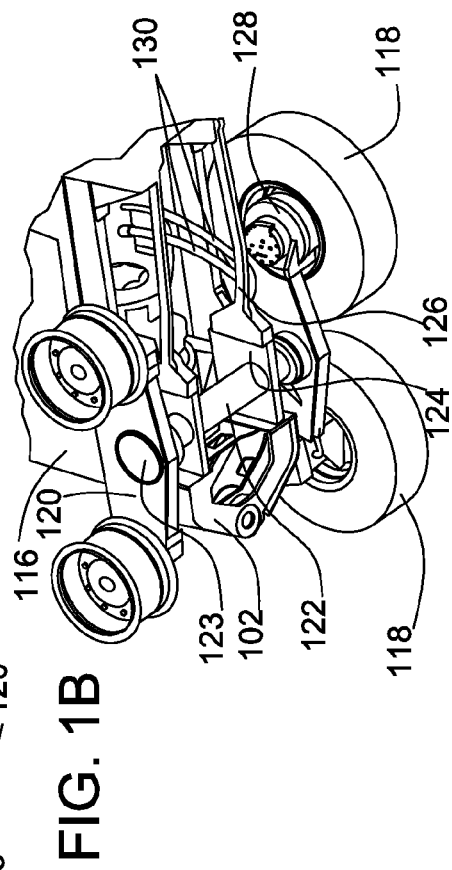

The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1A as 112, while support for the loading experienced by the blade 110 during operation is accomplished by a bar 114, which pivotally connects the implement portion 104 to the blade 110.

The engine frame 102 supports an engine (not visible), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith.

In a hydrostatically operated machine, the engine in the engine frame 102 may be associated with a hydrostatic pump (not shown), which may be part of a hydraulic system operating a propel system of the motor grader 101. In the embodiment shown, the motor grader 101 is driven by two sets of drive wheels 118 (only one set visible), with each set including two wheels 118 that are arranged in a tandem configuration along a beam 120. As can be more readily seen in the view of FIG. 1B, which is a bottom perspective of the engine frame 102 of the motor grader 101, two beams 120 are pivotally connected on the ends of a shaft or axle 122 at a respective pivot joint or bearing 123, with one beam 120 disposed on either side of the motor grader 101.

The axle 122, which is optional, is connected to the engine frame 102 of the motor grader 101 via two mounting plates 124 and two stabilizer bars such that the drive wheels 118 can effectively propel the motor grader 101. In an alternative embodiment, the axle 122 may be omitted and the beams 120 may instead be pivotally connected directly to the engine frame 102. At least one or both of the two drive wheels 118 on the beam 120 may be actively rotated or driven by a corresponding motor 128. When only one wheel 118 is powered, the other wheel 118 may be idle or, stated differently, may be free to rotate relative to the beam 120. In the embodiment shown in FIG. 1B, for example, the drive wheel 118 shown toward the right hand side of the figure is powered by a motor 128, while the drive wheel 118 shown toward the left hand side of the figure is idle and, thus, does not have a motor 128 associated therewith. Two motors 128 may be connected, one each, at corresponding ends of the two beams 120. A set of conduits 130 (only one set shown) may connect each motor 128 to an appropriate circuit of the motor grader 101 that can supply power to operate the motors 128.

Figure 2:
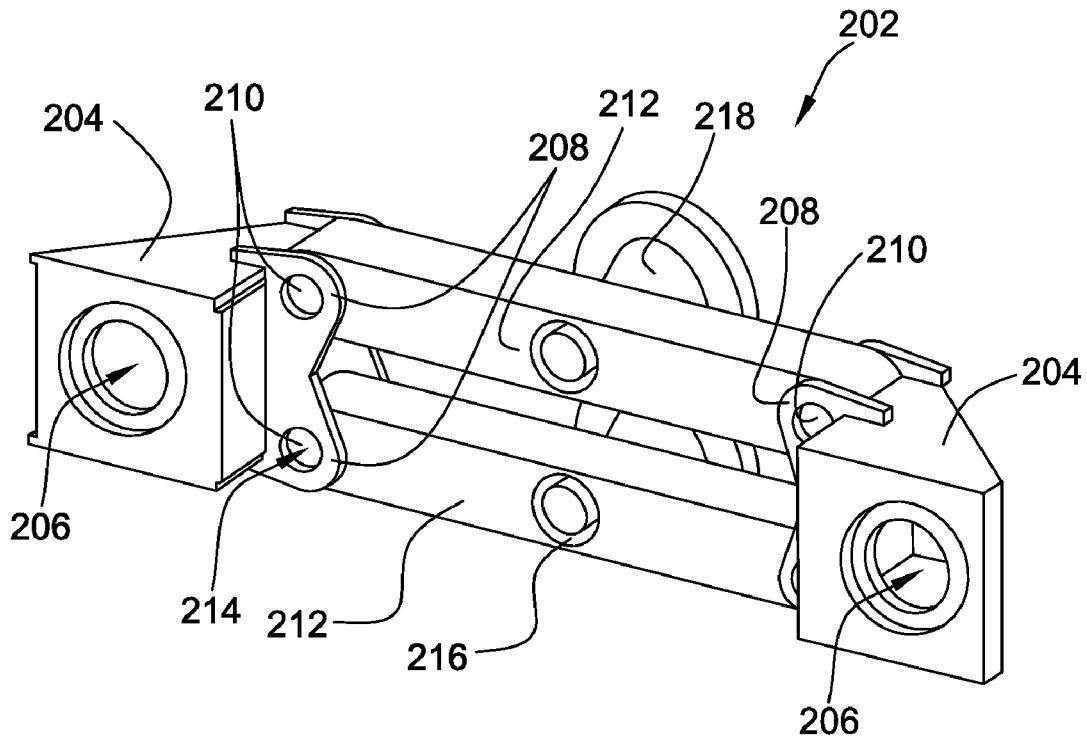
FIG. 2 is an outline of an alternative embodiment for a load sharing arrangement in accordance with the disclosure.
Figure 2A:
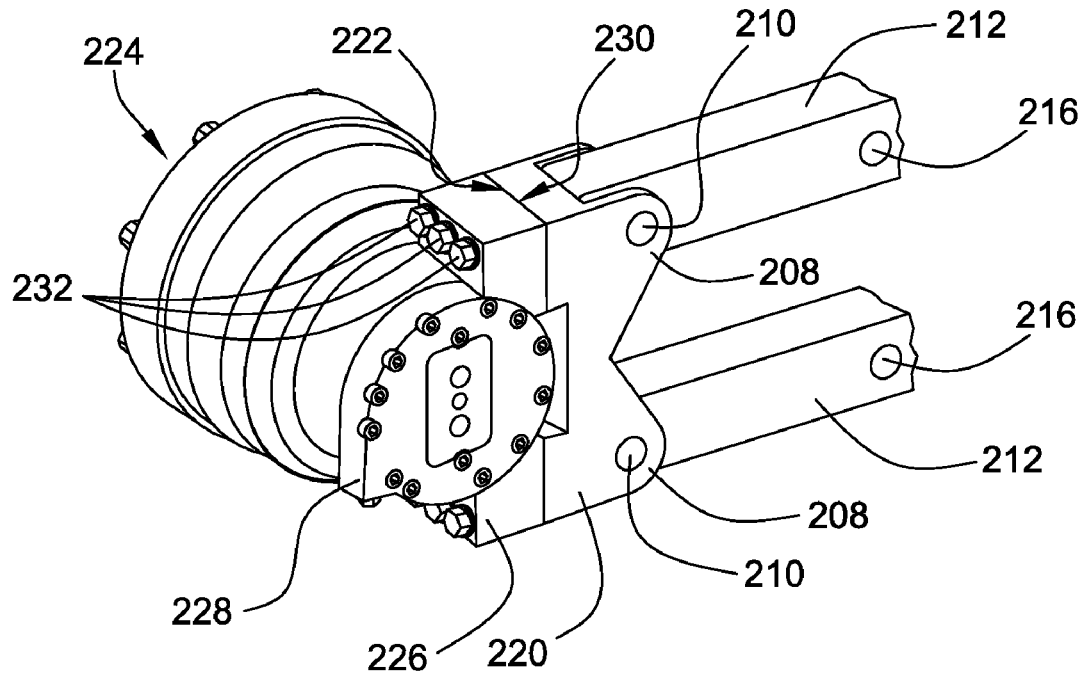
FIG. 2A is an outline of an alternative embodiment for a load sharing arrangement in accordance with the disclosure.

One embodiment for a four-bar-linkage arrangement 202 for use as part of a tandem drive configuration is shown in FIG. 2, and an alternate embodiment is shown in FIG. 2A. Machine components that are not part of the four-bar-linkage arrangement 202 have been omitted for clarity. The four-bar-linkage arrangement 202 includes two mounts 204. Each mount 204 is located on an end of the four-bar-linkage arrangement 202 and can be used for mounting of a variety or other components or systems, for example, a hydrostatic motor or an electric motor connected to a driven wheel, or an unpowered arrangement connected to an idle wheel. Each mount 204 forms an opening 206 that can accept a stator portion of a motor or a support for an idle wheel. Each mount 204 also forms two sets of pin bosses 208, each pin boss 208 having a pin opening 210 formed therein that extends parallel to the opening 206. The mounts 204 may advantageously be shaped symmetrical to each other such that they can be used interchangeably in the four-bar-linkage arrangement 202.

Two bars or linkages 212 are used to complete the four-bar-linkage arrangement 202. Each linkage 212 may form a pin opening 214 adjacent to either end thereof, and may further form a frame pin opening 216 that is arranged to pivotally connect each linkage 212 to a base 218. As shown in this figure, the frame pin opening 216 is disposed proximate a midpoint of each linkage 212, but such placement is optional. The frame pin opening 216 may generally be a pin opening formed anywhere along the main linkage 212. The bases 218 may be rigidly connected to the engine frame 102 (FIG. 1) of the motor grader 101, and may allow for pivotal motion of each of the linkages about the frame pin opening 216 with respect to the motor grader 101 (FIG. 1).

In the alternate embodiment for the four-bar-linkage arrangement 202, which is shown in FIG. 2A, like or similar components as described relative to the embodiment shown in FIG. 2 are described and denoted using the same reference numerals as previously used for the sake of simplicity. Accordingly, as shown in FIG. 2A, each of the two linkages 212 are connected to a header piece 220. Each header piece 220 forms the two sets of pin bosses 208, each pin boss 208 having a pin opening 210 formed therein that accommodates a pin (not shown) for connection to the two linkages 212. As in the embodiment of FIG. 2, the two header pieces 220 may be symmetrically shaped such that they can be used interchangeably in the four-bar-linkage arrangement 202.

Each header piece 220, as shown in FIG. 2A, has a flat portion 222 formed at an end thereof that is opposite the connection to the two linkages 212. Each flat portion 222 forms a plurality of threaded fastener openings that threadably accept fasteners. In the embodiment of FIG. 2A, a hydrostatic or electric motor 224 is shown connected to one of the header pieces 220. The motor 224 forms a mounting block 226 that is integrally formed around or connected to a stator portion 228 of the motor 224. The mounting block 226 may alternatively be connected to a stator portion of an unpowered or idle wheel mounting arrangement (not shown). Each mounting block 226 forms a flat surface 230 that mates with one of the flat portions 222 of the header piece 220 such that the corresponding motor 224 is aligned with the header piece 220. Fasteners 232 connect the mounting block 226 to the end of the header piece 220.

Figure 3:
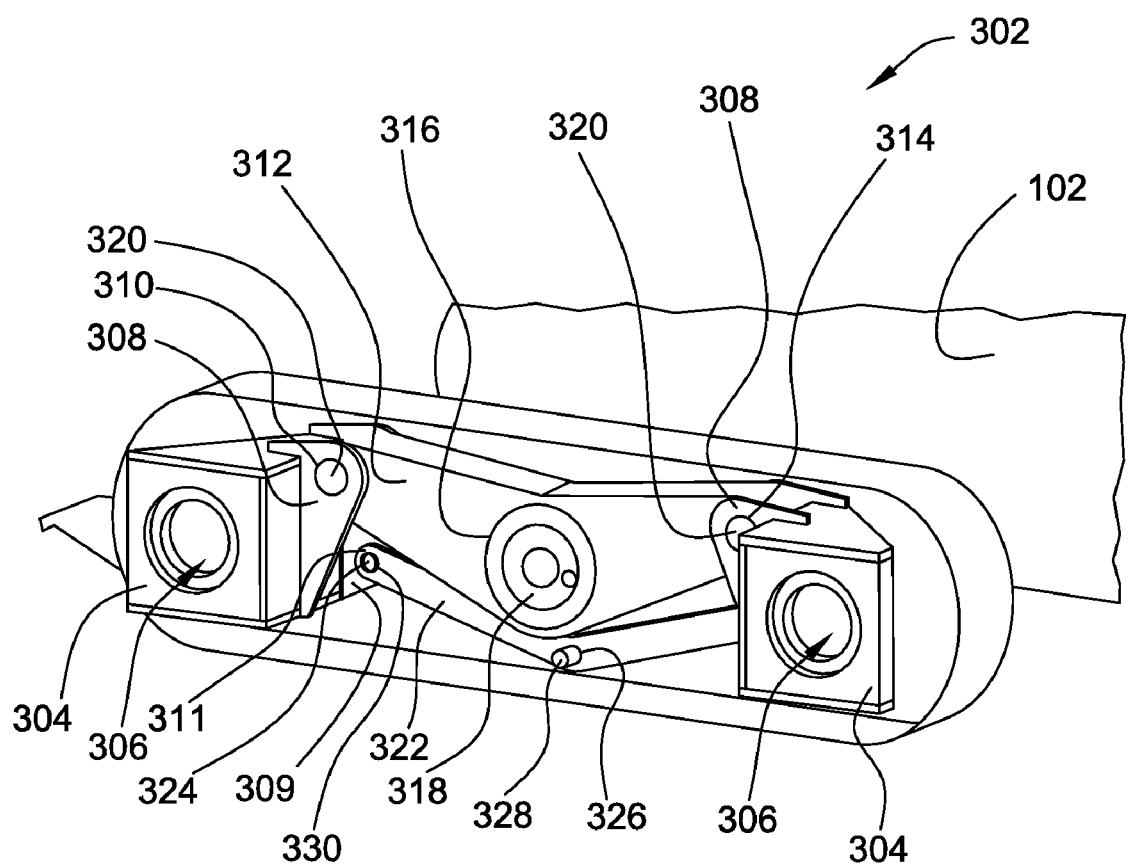
FIG. 3 is an outline of yet another alternate embodiment for a load sharing arrangement in accordance with the disclosure.
Figure 4:
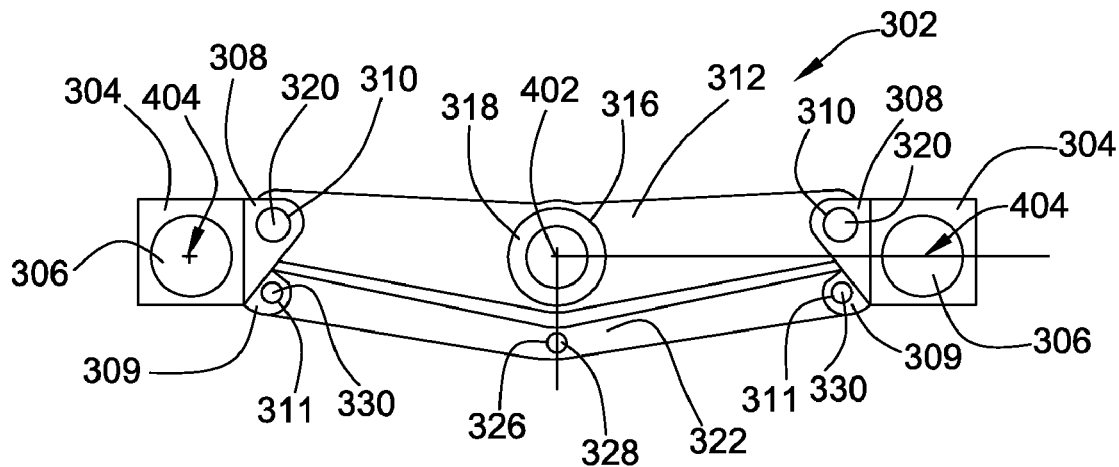
FIG. 4 is a side view of the load sharing arrangement shown in FIG. 3.

An outline view of an alternate embodiment for a four-bar-linkage arrangement 302 is shown in FIG. 3, with a side view shown in FIG. 4. The four-bar-linkage arrangement 302 is structurally similar to the four-bar-linkage arrangement 202 shown in FIG. 2, but incorporates improvements to the structures that are suitable for heavy-duty applications, for example, larger models of earthmoving machines used for mining or machines used by the military. As in the previous figures, machine components that are not part of the four-bar-linkage arrangement 302 have been omitted for clarity.

The four-bar-linkage arrangement 302 includes two mounts 304. Each mount 304 is located at or close to an end of the four-bar-linkage arrangement 302. The mounts 304 can be used to mount a wheel that is either powered by a motor or is idle, meaning, its rotation is not powered by a motor. Each mount 304 forms an opening 306 and a first set of pin bosses 308, with each pin boss 308 having a pin opening 310 formed therein that extends parallel to the opening 306. Each mount 304 may further form a second set of pin bosses 309, each having a pin opening 311 formed therein that extends parallel to the pin openings 310. In this embodiment, unlike the mounts 204 described relative to FIG. 2, the mounts 304 are mirror images of each other and cannot be used interchangeably in the four-bar-linkage arrangement 302.

A main bar or main linkage 312 forms a main pin opening 314 adjacent to either end thereof and a bearing opening 316 proximate to a midpoint thereof. The main linkage 312 is arranged to pivotally connect each of the two mounts 304 to a frame bearing 318. The frame bearing 318 may be connected to the engine frame 102 of the motor grader 101 (FIG. 1) and allow for pivotal motion of the main linkage 312 with respect to the motor grader 101 (FIG. 1) or, alternatively, the frame bearing 318 may be connected to a drive axle, for example, the axle 122 shown in FIG. 1B. Even though the frame bearing 318 is shown disposed proximate to a mid-portion of the main linkage 312, such placement is optional. The frame bearing 318 may, in general, be positioned anywhere along the main linkage 312. Two main pins 320 pivotally connect the main linkage 312 to the mounts 304. Each main pin 320 passes through a respective main pin opening 314 in the main linkage 312 and through a respective pin opening 310 in the pin bosses 308.

A stabilizing bar or stabilizing linkage 322 forms a stabilizing pin opening 324 adjacent to either end thereof and a pin opening 326 proximate to a midpoint thereof. The pin opening may be formed at any location along the length of the stabilizing linkage 322. The pin opening 326 is arranged to pivotally connect each of the two mounts 304 to a frame pin 328. The stabilizing linkage 322 of this embodiment has a "V" shape to accommodate the larger diameter of the frame bearing 318. The frame pin 328 may be connected to the engine frame 102 of the motor grader 101 (FIG. 1) and allow for pivotal motion of the stabilizing linkage 322 with respect to the motor grader 101 (FIG. 1). Two stabilizing pins 330 pivotally connect the stabilizing linkage 322 to the mounts 304. Each stabilizing pin 330 passes through a respective stabilizing pin opening 324 in the stabilizing linkage 322 and through a respective pin opening 311 in the second set of pin bosses 309.

As shown in FIG. 4, the main linkage 312 can pivot with respect to a bearing center point 402 of the frame bearing 318. Also, it can be appreciated that a motor arrangement for a driven wheel or an idle joint arrangement for an idle wheel installed will have a rotor portion that rotates with respect to a stator portion that is installed into the opening 306. The rotation of each wheel may occur with respect to a center point 404 that is likely to be located at or near the center point of the opening 306. In the embodiment shown in FIG. 4, the bearing center point 402 is at the same vertical height, H1, from the ground as the center point 404. Moreover, a horizontal distance, D1, between the bearing center point 402 and one of the two center points 404 is equal for both center points 404. In this arrangement, the stabilizing linkage 322 operates to balance uneven loading or a net torque tending to rotate the main linkage 312 with respect to the bearing center point 402.

The relative position of the main pins 320 and the stabilizing pins 330 with respect to the bearing center point 402 may be adjusted such that a form of pre-loading may be applied to the pins that counter-acts loading applied during operation. The embodiments shown in FIG. 5 and FIG. 6 that follow incorporate such variations in relative position. In the description that follows, elements of each four-bar-linkage described that are the same or similar to elements already described are denoted by the same reference numerals as previously used for the sake of simplicity.

Figure 5:
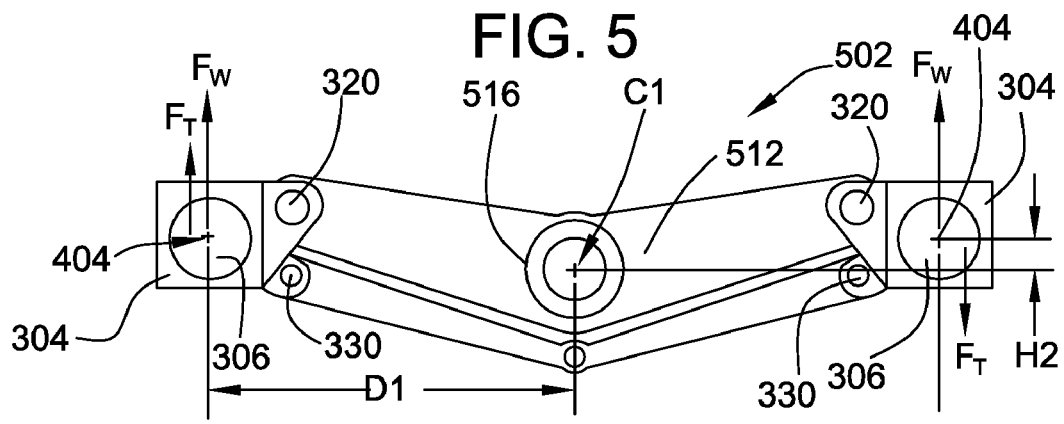
FIG. 5 is a side view of an alternate embodiment for a load sharing arrangement in accordance with the disclosure.

An alternate embodiment for a four-bar-linkage 502 is shown in FIG. 5. The four-bar-linkage 502 includes two mounts 304 that are connected to a main linkage 512. The main linkage 512 has many features that are similar to the main linkage 312 described relative to the embodiment presented in FIGS. 3 and 4, but differs in that a center point, C1, of a bearing opening 516 thereof is disposed at a vertical distance or height, H2, lower than the center points 404 of each opening 306. In this fashion, vertical forces, Fw, which may be attributed to the weight of the machine, can help counteract forces, Ft, resulting from torque imbalances that tend to rotate the main linkage 512 with respect to the center point C1. In the exemplary condition shown in FIG. 5, a vertical force Fw applied to the right side of the figure will counteract a force Ft such that a driven wheel (not shown) located on the right side of the four-bar-linkage 502 will maintain contact with the ground. Counteraction of forces in this fashion may also decrease the force contribution from the four-bar-linkage 502, which in turn will decrease the shear stresses resulting in the main pins 320 and the stabilizing pins 330.

Figure 6:
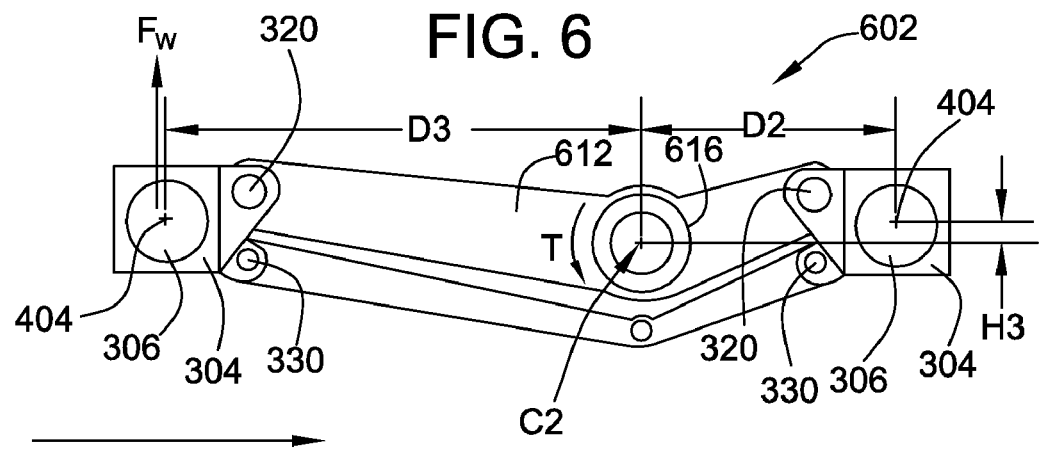
FIG. 6 is a side view of another alternate embodiment for a load sharing arrangement in accordance with the disclosure.

An alternate embodiment for a four-bar-linkage 602 is shown in FIG. 6. The four-bar-linkage 602 includes two mounts 304 that are connected to a main linkage 612. The main linkage 612 has many features that are similar to the main linkage 312 described relative to the embodiment presented in FIGS. 3 and 4, but differs in that a center point, C2, of a bearing opening 616 thereof is disposed at a vertical distance or height, H3, lower than the center points 404 of each opening 306. Also in this embodiment, the center point C2 is positioned at different horizontal distances from each of the center points 404. Thus, the center point C2 is positioned at a horizontal distance, D2, from the center point 404 on the right side of the figure, and at a different horizontal distance, D3, from the center point 404 on the left side of the figure. As can be more clearly seen in FIG. 6, the distance D3 is greater than the distance D2.

In this arrangement, the four-bar-linkage 602 may be tailored to reduce stresses in the main pins 320 and the stabilizing pins 330 more effectively for torque imbalances resulting from specific conditions during operation. For example, the four-bar-linkage 602 may be more effective in reducing torque imbalances when the machine is accelerating than it is when the machine is decelerating, or when the tandem arrangement includes one powered wheel and one idle wheel. For illustration, a direction of travel for the machine is denoted on FIG. 6 by a solid lined horizontal arrow. In this direction of travel, acceleration of the machine may create a torque, T, which tends to rotate the main linkage 612 in a counter-clockwise direction, which in turn will tend to raise a drive wheel (not shown) that is connected on the right side of the figure off the ground. To counteract the torque T, a resulting torque from a reaction force Fw on the main linkage 612 due to the weight of the machine will be applied. In this arrangement, the reaction force Fw acts over a longer lever arm, the distance D3, on one side of the main linkage 612 than it does on the other side such that the torque T is more readily counteracted.

INDUSTRIAL APPLICABILITY

The present disclosure is applicable to earthmoving or other types of heavy machines using tandem drive configurations. Although a motor grader 101 is illustrated in FIG. 1, the term "machine" may refer to any machine that performs some type of operation associated with an industry such as mining, construction, farming, transportation, or any other industry known in the art. For example, the machine 100 (FIG. 1) is an earth moving machine, but may alternatively be a wheel loader, excavator, dump truck, backhoe, motor-grader, material handler or the like. Similarly, although a blade 110 (FIG. 1) is illustrated as the attached implement, an alternative implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers or hammers, augers, and others. Further, even though a tandem drive arrangement is described relative to use of motors, one can appreciate that the devices and methods for balancing load described herein are equally applicable to drive arrangements using different either forms of motive devices, for example, electric motors, pneumatic devices, and so forth, or combinations or driven and idle wheels connected to a single beam, and may even be applicable to other industries, for example, electrically driven wheels for trucks associated with rail cars, etc. Regardless of the type of machine used or the type of implement employed, the methods described herein are advantageously capable of improving the performance of any machine by increasing fuel economy and decreasing stopping distances for machines having tandem drive arrangements by ensuring that all drive wheels of the machine are in contact with a substrate surface, share their load equally, and reduce stresses in various components of the drive arrangements.

We claim:

1. A machine, comprising:
    a frame portion;
    a main linkage pivotally connected to the frame portion;
    a frame bearing opening formed in the main linkage and having a bearing center point disposed at a first vertical position and a first horizontal position with respect to the frame portion;
    a stabilizing linkage pivotally connected to the frame portion;
    a first mount pivotally connected to the main linkage and to the stabilizing linkage, the first mount including a first opening formed in the first mount and having a center point disposed at a second vertical position and a second horizontal position with respect to the frame portion; and
    a second mount pivotally connected to the main linkage and to the stabilizing linkage, the second mount including a second opening formed in the second mount and having an additional center point disposed at a third vertical position and a third horizontal position with respect to the frame portion;
    wherein the main linkage, the stabilizing linkage, the first mount, and the second mount define a four-bar-linkage arrangement that operates to transfer unbalanced torque loads from the first mount and the second mount to the frame portion.

2. The machine of claim 1, further including:
    a first opening formed in the first mount;
    a first motor defining a first stator portion;
    wherein the first stator portion is engagably disposed within the first opening;
    a first rotor portion defined on the first motor and rotateably connected to the first stator portion; and
    a first drive wheel connected to the first rotor portion arranged to propel the machine when a first torque is applied to the first drive wheel from the first motor.

3. The machine of claim 1, wherein when the machine is disposed on a flat surface, the first vertical position, the second vertical position, and the third vertical position are at a first height from the flat surface.

4. The machine of claim 1, wherein when the machine is disposed on a flat surface:
    the first vertical position is at a first height from the flat surface; and
    the second vertical position and the third vertical position are at a second height from the flat surface;
    wherein the first height is less than the second height.

5. The machine of claim 1, wherein a first horizontal distance separates the first horizontal position from the second horizontal position, wherein a second horizontal distance separates the first horizontal position from the third horizontal position, and wherein the first horizontal distance is equal to the second horizontal distance.

6. The machine of claim 1, wherein a first horizontal distance separates the first horizontal position from the second horizontal position, wherein a second horizontal distance separates the first horizontal position from the third horizontal position, and wherein the first horizontal distance is greater than the second horizontal distance.

7. A machine, comprising:
    a frame;
    a tandem drive arrangement pivotally connected to the frame, the tandem drive arrangement including:
        a first motor defining a first stator portion and a first rotor portion,
        a first mount connected to the first stator portion,
        a first drive wheel connected to the first rotor portion,
        a first set of pin bosses connected to the first mount,
        a first pin opening formed in the first set of pin bosses and extending parallel to a first axis of rotation of the first rotor portion with respect to the first stator portion,
        a main linkage forming a first main pin opening adjacent a first end thereof and a bearing opening disposed in a mid-portion thereof, wherein the main linkage pivots with respect to the frame,
        a first main pin that is disposed within the first main pin opening and the first pin opening formed in the first set of pin bosses, and
        a load sharing arrangement associated with the tandem drive arrangement,
        wherein the load sharing arrangement balances unbalanced loading in the tandem drive arrangement by transferring the unbalanced loading to the frame.

8. The machine of claim 7, wherein the tandem drive arrangement further includes:
    a second idle arrangement defining a second stator portion and a second rotor portion;
    a second mount connected to the second stator portion;
    a second drive wheel connected to the second rotor portion;
    a second set of pin bosses connected to the second mount;
    a second pin opening formed in the second set of pin bosses and extending parallel to a second axis of rotation of the second rotor portion with respect to the second stator portion;
    a second main pin opening formed in the main linkage adjacent a second end thereof; and
    a second main pin that is disposed within the second main pin opening and the second pin opening formed in the second set of pin bosses,
    wherein the unbalanced loading is at least partially due to a powered rotation of the first drive wheel and an idle rotation of the second drive wheel.

9. The machine of claim 8, wherein the load sharing arrangement includes:

a third set of pin bosses connected to the first mount;
a third pin opening formed in the third set of pin bosses and extending parallel to the first pin opening;
a fourth set of pin bosses connected to the second mount;
a fourth pin opening formed in the fourth set of pin bosses and extending parallel to the second pin opening;
a stabilizing bar forming a first stabilizing pin opening adjacent a first end thereof, a second stabilizing pin opening adjacent a second end thereof, and a third pin opening proximate a mid-portion thereof;
a first stabilizing pin disposed to pivotally connect the first mount with the stabilizing bar by passing through the third pin opening and the first stabilizing pin opening;
a second stabilizing pin disposed to pivotally connect the second mount with the stabilizing bar by passing through the fourth pin opening and the second stabilizing pin opening; and
a third stabilizing pin connected to the frame and disposed within the third pin opening of the stabilizing bar such that the stabilizing bar is pivotally connected to the frame.

10. The machine of claim 7, further including:
a bearing opening formed in the main linkage, the bearing opening having a bearing center point disposed at a first horizontal position and a first vertical position with respect to the frame when the machine sits on a flat surface;
a first opening formed in the first mount, the first opening having a first center point disposed at a second horizontal position and a second vertical position with respect to the frame when the machine sits on the flat surface; and
a second opening formed in a second mount, the second opening having a second center point disposed at a third horizontal position and a third vertical position with respect to the frame when the machine sits on the flat surface.

11. The machine of claim 10, wherein the first vertical position is at a first height from the flat surface, wherein the second vertical position and the third vertical position are at a second height from the flat surface, and wherein the first height is lower than the second height.

12. The machine of claim 10, wherein a first horizontal distance separates the first horizontal position from the second horizontal position, wherein a second horizontal distance separates the first horizontal position from the second horizontal position, and wherein the first horizontal distance is greater than the second horizontal distance.

13. A tandem drive arrangement for a machine, the machine having a frame, the tandem drive arrangement comprising:
a first mount forming a first pin opening and a second pin opening;
a second mount forming an additional first pin opening and an additional second pin opening;
a first bar pivotally connected to the frame about a pivot, the first bar forming a first mount pin opening and a second mount pin opening;
a second bar pivotally connected to the frame, the second bar forming a first additional mount pin opening and an additional second mount pin opening;
a first pin pivotally connecting the first bar to the first mount, the first pin extending through the first pin opening and the first mount pin opening;
a second pin pivotally connecting the first bar to the second mount, the second pin extending through the additional first pin opening and the second mount pin opening;
a third pin pivotally connecting the second bar to the first mount, the second pin extending through the second pin opening and the first additional mount pin opening;
a fourth pin pivotally connecting the second bar to the second mount, the second pin extending through the additional second pin opening and the additional second mount pin opening; and
a frame pin pivotally connecting the second bar to the frame.

14. The tandem drive arrangement of claim 13, further including a bearing disposed between the first bar and the frame.

15. The tandem drive arrangement of claim 13, wherein the second bar has a V shape.

16. The tandem drive arrangement of claim 13, wherein the first mount further forms a flat surface, the second mount forms an additional flat surface, and wherein the flat surface and the additional flat surface are adapted to mate with a mating flat surface formed on a mounting block that is connected to a stator portion of a motor.

17. The tandem drive arrangement of claim 13, wherein the first pin and the second pin each has a larger cross section than each of the third pin and the fourth pin.

18. The tandem drive arrangement of claim 13, further including:
a pivot center point defined in association with the first bar;
a first center point defined in the opening; and
a second center point defined in the additional opening;
wherein the first center point and the second center point are disposed at a first vertical height with respect to the frame, and wherein the pivot center point is disposed at a second vertical height that is lower than the first vertical height with respect to the frame.

19. The tandem drive arrangement of claim 13, further including:
a pivot center point defined in association with the first bar;
a first center point defined in the opening; and
a second center point defined in the additional opening;
wherein a first horizontal distance separating the pivot center point from the first center point is greater than a second horizontal distance separating the pivot center point from the second center point.

* * * * *